United States Patent [19]

Okada

[11] Patent Number: 5,404,235
[45] Date of Patent: Apr. 4, 1995

[54] LIQUID CRYSTAL DEVICE
[75] Inventor: Shinjiroh Okada, Hiratsuka, Japan
[73] Assignee: Canon Kabushiki Kaisha, Tokyo, Japan
[21] Appl. No.: 173,862
[22] Filed: Dec. 23, 1993

Related U.S. Application Data

[63] Continuation of Ser. No. 1,410, Jan. 7, 1993, abandoned, which is a continuation of Ser. No. 692,944, Apr. 29, 1991, abandoned.

[30] Foreign Application Priority Data

May 1, 1990 [JP] Japan .................. 2-111842

[51] Int. Cl.⁶ ............................. G02F 1/1343
[52] U.S. Cl. ......................... 359/54; 359/55; 359/56; 359/87
[58] Field of Search .......... 359/54, 55, 56, 84, 359/85, 87

[56] References Cited

U.S. PATENT DOCUMENTS

| | | | |
|---|---|---|---|
| 4,035,060 | 7/1977 | Tsunoda et al. | 359/87 X |
| 4,082,430 | 4/1978 | Schulthess et al. | 359/55 |
| 4,641,923 | 2/1987 | Bohmer et al. | 359/87 |
| 4,734,688 | 3/1988 | Adams | 359/84 |
| 4,738,515 | 4/1988 | Okada et al. | 350/350 |
| 4,773,738 | 9/1988 | Hayakawa et al. | 359/56 |
| 4,802,744 | 2/1989 | Shindo et al. | 359/56 X |
| 4,898,456 | 2/1990 | Okada et al. | 350/350 |
| 4,902,107 | 2/1990 | Tsuboyama et al. | 350/350 |
| 4,923,285 | 5/1990 | Ogino et al. | 350/331 |
| 4,973,135 | 11/1990 | Okada et al. | 350/334 |
| 5,016,989 | 5/1991 | Okada | 350/350 |
| 5,128,786 | 7/1992 | Yanagisawa | 359/54 |
| 5,136,407 | 8/1992 | Clerc | 359/55 |

FOREIGN PATENT DOCUMENTS 61-94023  5/1986  Japan.
63-198022  8/1988  Japan .................. 359/59

OTHER PUBLICATIONS

N. A. Clark, M. A. Handshy, and S. T. Lagerwall, "Ferroelectric Liquid Crystal Electrooptics Using the Surface Stabilized Structure, Mol. Cryst." 1983, vol. 94, pp. 213–234.

Primary Examiner—William L. Sikes
Assistant Examiner—Ron Trice
Attorney, Agent, or Firm—Fitzpatrick, Cella, Harper & Scinto

[57] ABSTRACT

A liquid crystal device of a matrix type, having a pair of electrode substrates disposed in spaced opposition to each other, with a liquid crystal, such as a ferroelectric liquid crystal, in the space between the substrates, which provides improved display quality. A group of scanning signal lines and a group of information signal lines are arranged on the mutually opposing surfaces of the substrates, and extend perpendicular to each other. In one form of the present invention, the scanning signal lines have a smaller resistance than the information signal lines. In another form, the scanning signal lines have a smaller resistance to the input thereto than the information signal lines. Thus, the peak value of ripple on the scanning signal lines, hence, the influence of the ripple on the non-select pixels, is reduced, thereby eliminating flickering on the screen caused by the ripple.

5 Claims, 5 Drawing Sheets

INFORMATION SIGNAL OF BLACK PIXEL

BLACK INFORMATION SIGNAL OF ONE COMMON LINE

RIPPLE ON NON-SELECT COMMON SIGNAL LINE

INFORMATION SIGNAL OF WHITE PIXEL

LIQUID CRYSTAL DEVICE

This application is a continuation of application Ser. No. 08/001,410, filed Jan. 7, 1993, now abandoned, which is a continuation of application Ser. No. 07/692,944, filed Apr. 29, 1991, now abandoned.

BACKGROUND OF THE INVENTION

1. Field of the Invention

The present invention relates to a display device employing a ferroelectric liquid crystal.

2. Related Background Art

Among display devices employing ferroelectric liquid crystals, a device such as that disclosed in Japanese Patent Laid-Open No. 94023/1986 is known, in which a liquid crystal cell is comprised of a pair of glass substrates disposed in opposition to each other with a cell gap of about 1 to 3 microns therebetween, the substrates having electrodes on the mutually opposing surfaces thereof and being subjected to alignment treatment. A ferroelectric liquid crystal is charged in the cell gap.

Such a display device employing a ferroelectric liquid crystal has the following characteristics: because a ferroelectric liquid crystal is capable of spontaneous polarization, a switching action can be caused by utilizing a combination force resulting from an external electric field and spontaneous polarization; and because the long-axis direction of molecules of a ferroelectric liquid crystal is in one-to-one relationship with the direction of spontaneous polarization, a switching action can take place depending on the polarity of an external electric field.

In general, a chiral smectic liquid crystal (SmC*, SmH*) is used as the ferroelectric liquid crystal. When such a liquid crystal is in bulk form, molecules of the liquid crystal are oriented with their long axes being twisted. However, when the liquid crystal is charged in a cell having a cell gap of about 1 to 3 microns, as in the above-described cell, it is possible to relieve the liquid crystal of the long-axes twisted orientation (N. A. Clark et al., MCLC (1983), Vol, 194, pages 213 to 234).

In an actual structure of a ferroelectric liquid crystal cell, simple matrix substrates, such as those shown in FIG. 5A and 5B, are used. The cell comprises, as shown in a section in FIG. 5A, upper and lower (as viewed in FIG. 5A) glass substrates 21, and a liquid crystal 26 charged in the space between the substrates 21. Each of the substrates 21 has a group of indium tin oxide (ITO) stripe electrodes 22, a silicon dioxide (SiO$_2$) insulating film 23, and a polyimide alignment film 24, these being formed on the substrate 21 in this order. The charged liquid crystal 26 is sealed by sealing members 25. Each group of the ITO stripe electrodes 22 is arranged in a pattern such as that shown in FIG. 5 (b). The group of the electrodes 22 on the upper substrate 21 and that on the lower substrate 21 extend in directions perpendicular to each other.

When, however, the above-described display device performs line-sequential scanning, information signals indicating the same information contents have the same waveform and, in addition, the same writing timing. As a result, the following problems arise:

(1) As the size of the display screen of the liquid crystal display device increases, and as the level of resolution of the device increases, the wiring resistance of the scanning signal lines (hereinafter referred to as "common lines" unless otherwise specified) and that of the information signal lines (hereinafter referred to as "segment lines" unless otherwise specified) increase, thereby increasing the delay in waveform transmission through the electrode lines;

(2) If a ferroelectric liquid crystal (hereinafter abbreviated to "FLC" unless otherwise specified) is used, the thickness of the liquid crystal layer must be maintained within the range from 1 to 2 μm in order to ensure good bistability. The liquid crystal layer must be thin (about 1 to 2 μm thick) for other reasons also; for example, with a greater thickness, the driving voltage will have to be increased, and retardation may result in non-negligible coloring. As a result, the electrostatic capacity of the liquid crystal layer increases, and is approximately six times that of a twisted namatic liquid crystal in a conventional device; and (3) The on-resistance of the driving IC cannot easily be reduced to a level of about 1 kΩ or lower because of mass production requirements, etc.

These problems lead to a phenomenon in which a driving waveform applied to the liquid crystal layer is rounded. This rounding is disadvantageous in that it causes problems such as an in-cell distribution of the threshold of the FLC switching that result in a reduction in the switching margin. Another disadvantage is that the non-select pixels are greatly influenced.

The second disadvantage will be described with reference to FIGS. 2A to 2D. At a non-select pixel, the common line is supplied with the reference voltage, whereas the segment line is supplied with the information signal for the select pixels. When, as shown in FIG. 2A, the information signal for one frame first indicates that all of the pixels should be black b, and then indicates that a part of the pixels should be a white circle w, since a greater part of the information signal for one frame indicates "black" (as shown in FIG. 2B), differentiation-waveform ripple (shown in FIG. 2C) corresponding to the rises and the falls of the information signal occurs on the common line. The peak value of such ripple is determined by the information contents of the information signal. Substantially no ripple occurs on the common line when the information signal indicates, for example, a pattern with one-bit checkers because, in such cases, the voltages input to two adjacent segment lines have opposite (positive and negative) polarities, and have the same peak value.

However, when, as shown in FIG. 2A, it is desired that a greater part of the frame be "black", ripple occurs corresponding to the rises and the falls of the black information signal, as shown in FIG. 2C. In this case, if the information signal for producing the white circle w has, as shown in FIG. 2D, a waveform in an inverted phase, the information signal for the "white" pixels is emphasized by the ripple, conversely to the case of the information signal for the "black" pixels. Thus, a difference occurs between the magnitude of influence on the non-select pixels by the "black" signal and that by the "white" signal. In other words, the difference in magnitude of the information signal at a select pixel causes a difference in the level of fluctuation of particles at a non-select pixel. The difference in the fluctuation level results in flickering on the screen, thereby greatly deteriorating the quality of display. In brief, when a black portion b (in FIG. 2A) is being produced, the contents of the information signal are common to all of the pixels on the screen; however, when a white circle w (in FIG.

2 A) is being produced, the actual waveforms (resulting from the addition or subtraction of ripple) become different between segment lines supplied with a "white" signal and segment lines supplied with a "black" signal, and are thus distorted.

SUMMARY OF THE INVENTION

In view of the above-described problem of the background art, an object of the present invention is to eliminate flickering on the screen caused by ripple on the common signal lines of a ferroelectric liquid crystal device, and thus to improve display quality.

Another object of the present invention is to provide a liquid crystal device of a matrix type, having a pair of electrode substrates disposed in spaced opposition to each other, a liquid crystal in the space between the substrates, and a group of scanning signal lines and a group of information signal lines being arranged on the mutually opposing surfaces of the electrode substrates and extending perpendicular to each other, wherein the resistance of the scanning signal lines is smaller than that of the information signal lines.

A further object of the present invention is to provide such a liquid crystal device of a matrix type, wherein the resistance of the scanning signal lines to the input thereto is smaller than that of the information signal lines.

DETAILED DESCRIPTION OF THE PREFERRED EMBODIMENTS

Figure 1A:
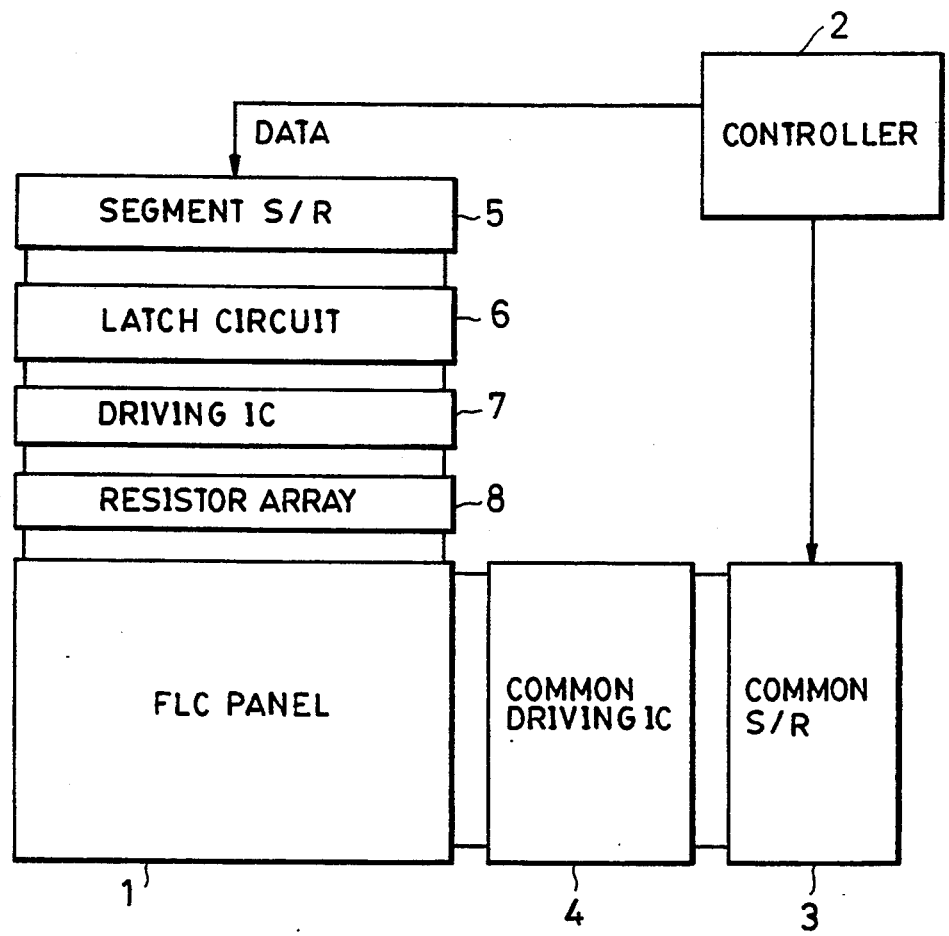
FIG. 1A is a block diagram of a circuit for driving a liquid crystal cell of a liquid crystal device according to an embodiment of the present invention.

The preferred forms of a liquid crystal device according to the present invention are as follows:

In one form of a liquid crystal device according to the present invention, the liquid crystal device is of a matrix type, comprising: a pair of electrode substrates disposed in spaced opposition to each other, with a liquid crystal in the space between the substrates; and a group of scanning signal lines and a group of information signal lines being arranged on the mutually opposing surfaces of the electrode substrates, and extending perpendicular to each other, wherein the resistance of the scanning signal lines is smaller than that of the information signal lines.

In another form of a liquid crystal device according to the present invention, the liquid crystal device is of a matrix type, comprising: a pair of electrode substrates disposed in spaced opposition to each other, with a liquid crystal in the space between the substrates; and a group of scanning signal lines and a group of information signal lines being arranged on the mutually opposing surfaces of the electrode substrates, and extending perpendicular to each other, wherein the resistance of the scanning signal lines to the input thereto is smaller than that of the information signal lines.

Thus, in a liquid crystal device according to the present invention, when the resistance of the scanning signal lines is compared with the resistance of the information signal lines, with the resistance of the liquid crystal layer serving as the reference, the resistance of the scanning signal lines is smaller than that of the information signal lines. This feature is achieved by, for example, making the wiring resistance of the scanning signal lines smaller than that of the information signal lines, or making the resistance of the scanning signal lines to the input thereto smaller than that of the information signal lines.

In such an arrangement of the present invention, the voltage supplied from a segment driving circuit is divided between the resistance of the segment lines and the resistance of the common lines. After the passage of a certain period of time, the liquid crystal layer is charged, and FLC switching actions take place at select pixels. In this process, the peak value of ripple on the common lines is determined by that voltage fraction of the information signal input from the segment driving circuit to the common lines under the resistance thereof; the peak value of the ripple voltage decreases as the proportion of the voltage fraction in the common lines with respect to the total input voltage from the segment side decreases. According to the present invention, this proportion of the voltage fraction to the total input voltage is smaller than the corresponding value (=1) in the prior art. Therefore, the peak value of ripple occurring on the common lines is smaller than that in the prior art. This makes it possible to reduce the magnitude of influence on the segment signal by the ripple even when there are different types of the segment signal contents. Thus, the magnitude of influence on the non-select pixels by the ripple is reduced, thereby making it possible to effect high quality display.

The present invention will now be described with reference to the drawings.

Embodiment 1

FIG. 1A shows, in a block diagram, a circuit for driving a liquid crystal cell 1. In the driving circuit, scanning signal information from an image information generating means (not shown) is supplied as a scanning signal to a group of scanning signal lines of the liquid crystal cell 1 via a controller 2, a common S/R 3 and a common driving IC 4. On the other hand, image information from the image information generating means is supplied as an information signal to a group of information signal lines of the liquid crystal cell 1 via the controller 2, a segment S/R 5, a latch circuit 6, a driving IC 7 and a resistor array 8.

Figure 1B:
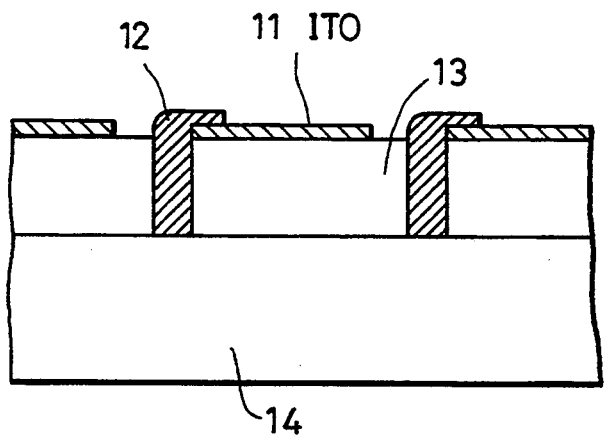
FIG. 1B is a fragmentary sectional view of the liquid crystal cell, showing the structure of common signal lines.
Figure 2A:
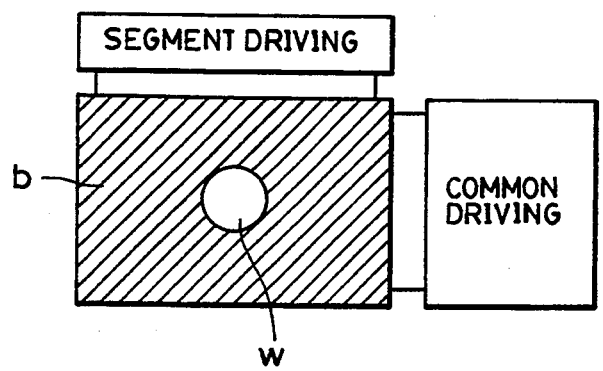
FIG. 2A to 2D are views showing problems of driving waveforms in the background art.
Figure 2B:
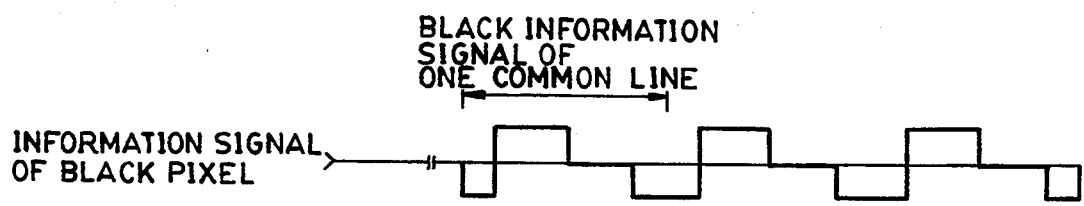
Figure 2C:
Figure 2D:
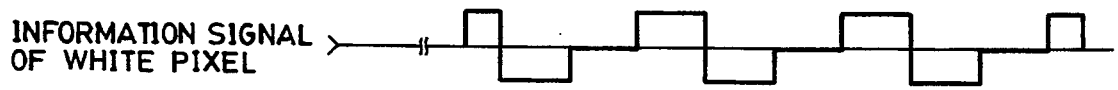

FIG. 1B shows, in a fragmentary section, the structure of the common signal lines of the liquid crystal cell 1. As shown in FIG. 1B, the liquid crystal cell 1 includes a first substrate (glass substrate) 14 for supporting the common signal lines. Arranged on the surface of the substrate 14 are: stripe-shaped ITO wiring 11 having a width of 250 μm, a resistance (sheet resistance) of 20Ω and a film thickness of about 3000 Å; and Mo (molybdenum) wiring 12 provided along the ITO wiring 11 with part of the Mo wiring 12 contacting the ITO wiring 11, the Mo wiring 12 having a width of 40 μm and a thickness of about 9000 Å. The ITO wiring 11 and the Mo wiring 12 constitute the scanning signal lines. A layer of an organic resin (polyamide) is formed on the surface of the substrate 14 to locate the ITO wiring 11 at a position above the surface of the substrate 14. Although not shown, the segment lines are similarly arranged on a second substrate supporting them, and the segment lines include similar Mo wiring arranged on the substrate on the basis of the wiring resistance of the information signal lines. With the above-described construction, the segment lines and the common lines have the same wiring resistance, that is, 2 KΩ. However, a resistance of 4 KΩ (in the form of the resistor array 8 shown in FIG. 1A) is serially introduced at the input of all the information signal lines so that the total wiring resistance of the information signal lines, which also includes the resistance of an output IC of the driving IC 7, is 8 KΩ.

Although not shown, the liquid crystal cell 1 further includes an insulating film formed on the ITO wiring 11 and the Mo wiring 12 on each of the first and second substrates, the insulating film consisting of a $Ta_2O_5$ sputtered film having a thickness of about 500 Å. Further, an alignment film (made of Polyimide LP-64, product of Toray Industries, Inc.) having a thickness of about 400 Å is formed on each of the insulating films. The surfaces of the alignment films are subjected to a rubbing treatment in which these film surfaces on the first and second substrates are rubbed with a piece of acrylic flocked fabric in the same direction. The substrates with the wirings 11 and 12, etc. are opposed to each other in such a manner that the scanning signal lines and the information signal lines extend perpendicular to each other. $SiO_2$ beads are sprayed over the mutually opposing surfaces of the substrates so that a cell gap of about 1.5 μm is defined between the substrates.

Figure 3A:
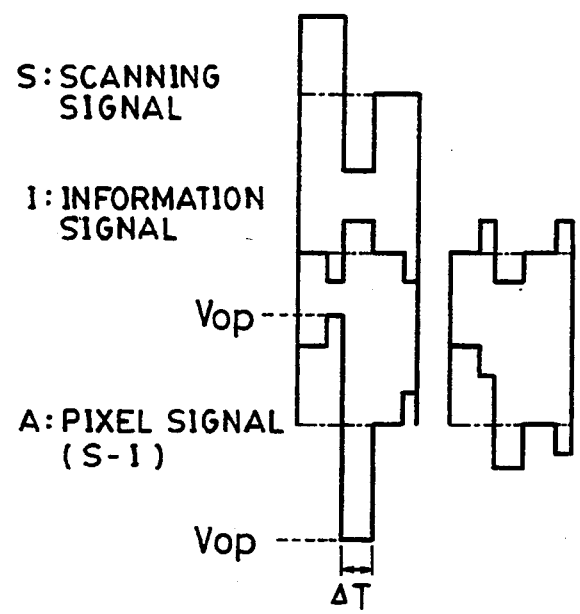
FIG. 3A and 3B are timing charts showing driving waveforms in the device shown in FIGS. 1A and 1B.
Figure 3B:
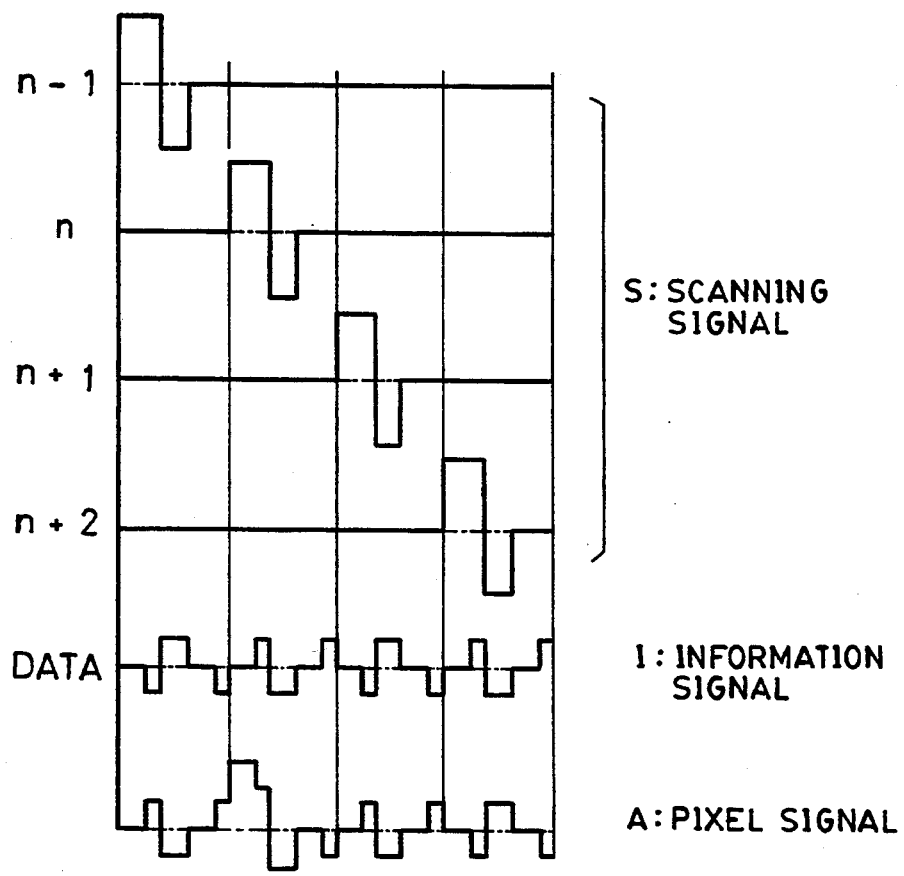

A liquid crystal (CS-1014, product of Chisso K. K.) was charged in the cell gap of the liquid crystal cell 1, and the characteristics of the liquid crystal device was examined. In this examination, a scanning signal S, an information signal I and a pixel signal A (a composite signal expressed as (S−1)), such as those shown in FIG. 3, were used as the driving waveforms under the conditions of: $\Delta T=50$ μs, $V_{op}=13$ to 17 V/μm.

As described above, the resistor array 8 is provided for the segment lines; more specifically, the resistor array 8 is serially incorporated in the driving IC 7 composed of an analog switch. Therefore, when the segment lines and the common lines arranged on either side of the liquid crystal layer are compared with each other, the segment lines have a greater resistance to the input thereto than the common lines. This arrangement is provided in view of the following fact: The voltage supplied to the segment lines is divided between the resistance of the segment lines and the resistance of the common lines. Thereafter, when a given period of time (which is, roughly speaking, a time constant determined by the capacity C of the liquid crystal and the wiring resistance R) has passed, the liquid crystal layer is charged, and FLC switching actions take place at select pixels. In this process, the peak value of ripple on the common lines is determined by that voltage fraction of the information signal input from the segment driving side to the common lines under the resistance thereof.

In a conventional liquid crystal device, the resistance of the segment lines, including the on-resistance of the output IC, is 4 KΩ, while the resistance of the common lines is also 4 kΩ. If the time constant of the pulse delay in the conventional device is expressed as $\tau_0$, and the peak value of ripple in the conventional device is expressed as $V_0$, this embodiment of the present invention where the total wiring resistance of the segment lines is 8 KΩ has the following feature: although the value of the time constant $\tau_0$ is the same because the pulse delay is the same, the peak value of ripple on the common lines is $\frac{1}{2}$ $V_0$. The switching of a FLC takes place in accordance with the electric field strength. Therefore, the peak value of ripple is greatly influential when the duration of the driving pulse is 50 μs or thereabout, though the peak value is not so influential when the driving pulse duration is short (is not more than 20 μs). According to this embodiment, since the peak value of ripple is reduced to $\frac{1}{2}$ of the conventional value, the influence of the ripple is correspondingly reduced; this is a considerable reduction.

For the above-described reason, display was possible with greatly improved display characteristics.

Embodiment 2

Figure 4:
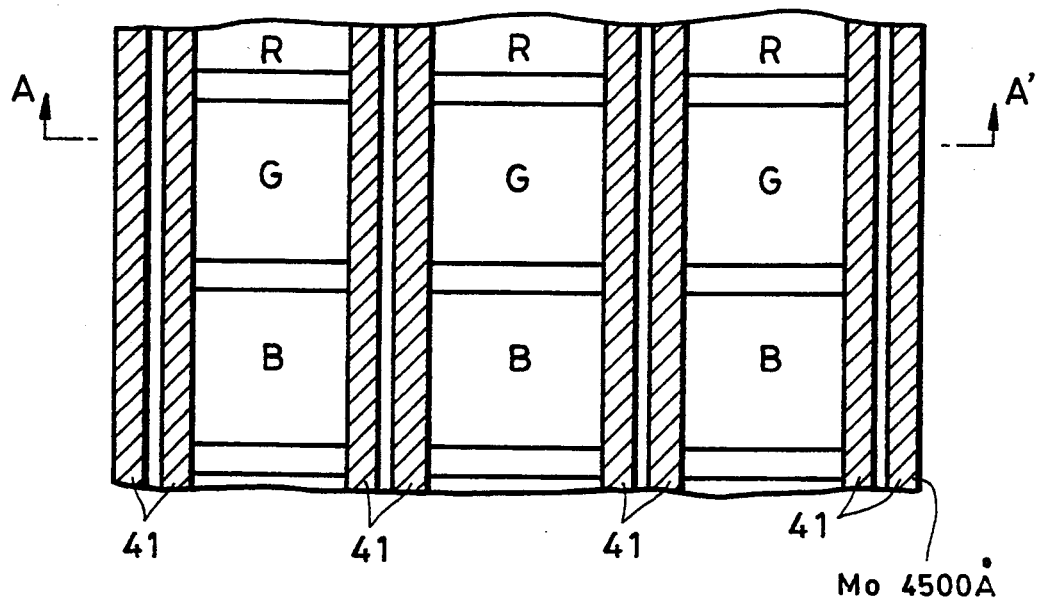
FIGS. 4A to 4C schematically show a liquid crystal device according to another embodiment of the present invention, FIG. 4A schematically showing the structure of common signal lines, FIG. 4B being a sectional view taken along the line A—A' shown in FIG. 4A, and FIG. 4C being a sectional view showing the structure of segment signal lines.
Figure 4:
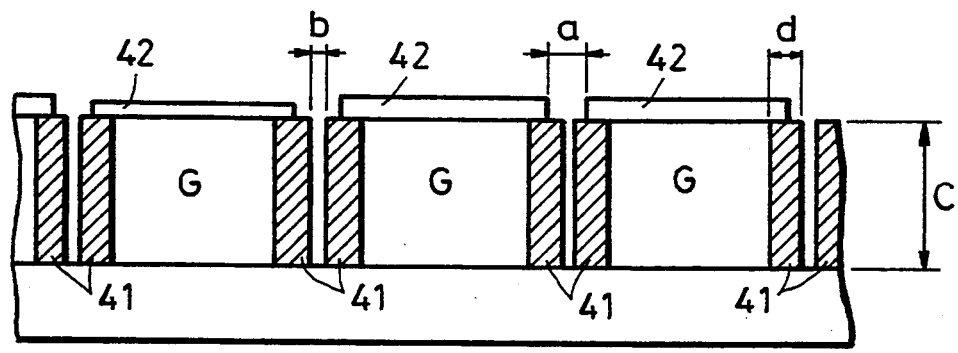
Figure 4:
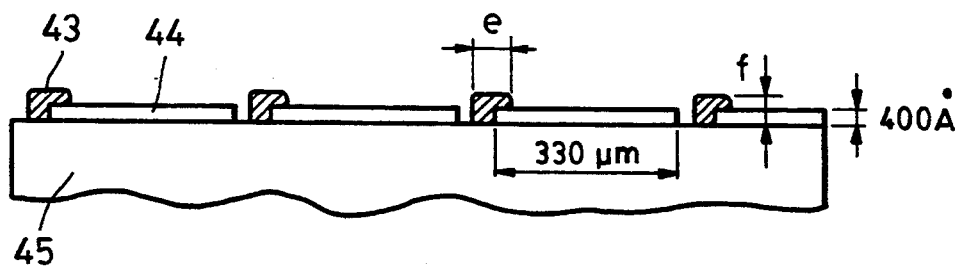
Figure 5A:
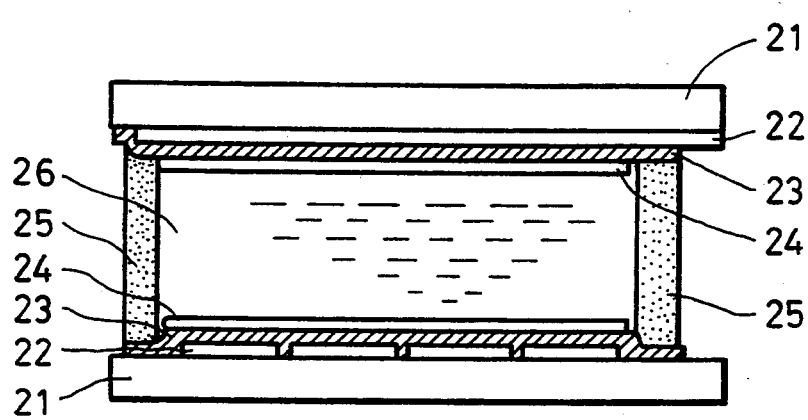
FIGS. 5A and 5B are views showing an example of the structure of a liquid crystal cell of the background art, FIG. 5A being a sectional view of the liquid crystal cell, and FIG. 5B being a plan view showing the electrode pattern.
Figure 5B:
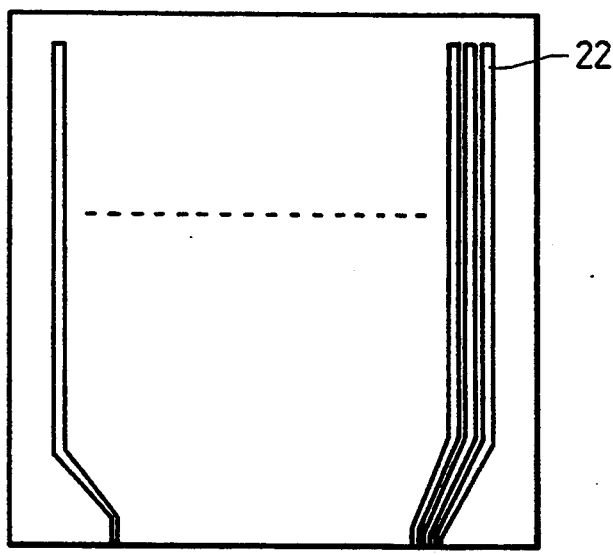

FIGS. 4A through 4C schematically show a liquid crystal device according to another embodiment of the present invention. In this embodiment, a liquid crystal device was obtained, in which the influence by ripple on the scanning signal lines was eliminated, and in which a high level of color reproduction was achieved by providing color filter layers within the pixels. The layers were formed with those portions of the scanning signal lines corresponding to the individual pixels being shielded from light.

Referring to FIG. 4A, the symbols R, G and B denote color filter layers of red, green and blue, respectively. The three-color filter layers were formed in the following manner. The entire surface of a substrate was coated with a colored resin (comprising a photosensitive polyamide (PA-1000C, product of Ube Industries, Ltd.) and a pigment dispersed in the resin to serve as a dye) by a spinner coating method with a thickness of 1.0 μm. The resultant coating was patterned by exposing it to light while the coating was masked. Such coating and masked-exposure processes were repeated three times to form the three-color filter layers.

Before the color filter layers were formed, scanning signal lines 41 (made of Mo) were formed by depositing molybdenum on a substrate surface by a sputtering method, and subjecting the Mo deposit to selective etching using a liquid mixture of phosphoric acid and nitric acid. The above-described color filter layers were formed by a spinner coating method over the thus formed scanning signal lines 41. Subsequently, ITO electrodes 42 were formed.

As shown in FIG. 4B, the ITO electrodes 42 were arranged at an interval a of 13 μm. The scanning signal lines 41 were arranged at an interval b of 7 μm, and had a width d of 10 μm.

On the other hand, information signal lines 43 (made of Mo) had the structure shown in FIG. 4C. The information signal lines were formed on a glass substrate 45 with a thickness f of 1000 Å and a width e of 10 μm. ITO electrodes 44 were formed with a thickness of 400 Å.

With the thus formed scanning signal lines 41 and the information signal lines 43, the resistance of the stripe electrodes (26 mm) of the scanning signal lines 41 was 3.6 KΩ, while the resistance of those of the information signal lines 43 was 10 KΩ. Thus, the resistance of the scanning signal lines was about ⅓ (one third) of the information signal lines.

When the liquid crystal device according to this embodiment was used to display images, the device was capable of effecting excellent display which was, similarly to the case of the first embodiment, free from flickering.

As described above, according to the present invention, since the resistance of the scanning signal lines is smaller than that of the information signal lines, it is possible to reduce the peak value of ripple on the scanning signal lines, and thus to greatly improve the quality of display by a FLC.

What is claimed is:

1. A liquid crystal device, comprising:
   a plurality of scanning lines to which a scanning signal is applied, said plurality of scanning lines being disposed on a first substrate;
   a plurality of information lines to which an information signal is applied, said plurality of information lines being disposed on a second substrate;
   a liquid crystal in a space between said first and second substrates; and
   a plurality of pixels, each of said pixels having a pixel electrode structure for providing an electric field to cause said each pixel to exhibit an optical state, said electrode structure consisting essentially of one of said scanning lines and one of said information lines, wherein
   said electric field for causing said each pixel to exhibit said optical state is provided only by combination of said scanning signal and said information signal and wherein a resistor is electrically connected to said scanning line in said electrode structure in which the resistance of said Scanning line is less than the resistance of said information line.

2. A liquid crystal device, comprising:
   a plurality of scanning lines to which a scanning signal is applied, said plurality of scanning lines being disposed on a first substrate;
   a plurality of information lines to which an information signal is applied, said plurality of information lines being disposed on a second substrate;
   a liquid crystal in a space between said first and second substrates; and
   a plurality of pixels, each of said pixels having a pixel electrode structure for providing an electric field to cause said each pixel to exhibit an optical state, said electrode structure consisting essentially of one of said scanning lines and one of said information lines, wherein
   said electric field for causing said each pixel to exhibit said optical state is provided only by combination of said scanning signal and said information signal and wherein the resistance of said scanning line in said electrode structure is less than the resistance of said information line.

3. A device according to claim 2, wherein each of said scanning lines comprises two conductive layers, at least one of which is transparent.

4. A device according to claim 2, wherein said liquid crystal is ferroelectric liquid crystal.

5. An apparatus comprising liquid crystal device comprising:
   a plurality of scanning lines to which a scanning signal is applied, said plurality of scanning lines being disposed on a first substrate;
   a plurality of information lines to which on information signal is applied said plurality of information lines being disposed on a second substrate;
   a liquid crystal in a space between said first and second substrates; and
   a plurality of pixels, each of said pixels having a pixel electrode structure for providing an electric field to cause said each pixel to exhibit an optical state, said electrode structure consisting essentially of one of said scanning lines and one of said information lines; and
   a controller for controlling application of said scanning signal and said information signal, wherein said electric field for causing said each pixel to exhibit said optical state is provided only by combination of said scanning signal and said information signal and wherein the resistance of said scanning line in said electrode structure is less than the resistance of said information line.

* * * * *

UNITED STATES PATENT AND TRADEMARK OFFICE
CERTIFICATE OF CORRECTION

PATENT NO. : 5,404,235
DATED : April 4, 1995
INVENTOR(S) : SHINJIROH OKADA

It is certified that error appears in the above-indentified patent and that said Letters Patent is hereby corrected as shown below:

COLUMN 7

Line 41, "Scanning" should read --scanning--.

COLUMN 8

Line 23, "liquid" should read --a liquid--.
Line 28, "on" should read --an--.
Line 29, "applied" should read --applied,--.

Signed and Sealed this

Eighteenth Day of July, 1995

Attest:

BRUCE LEHMAN

*Attesting Officer*    *Commissioner of Patents and Trademarks*